US007134093B2

(12) United States Patent
Etgen et al.

(10) Patent No.: US 7,134,093 B2
(45) Date of Patent: Nov. 7, 2006

(54) GRAPHICAL USER INTERFACE FOR DIRECT CONTROL OF DISPLAY OF DATA

(75) Inventors: Michael P. Etgen, Apex, NC (US); John H. Bailey, Durham, NC (US); Emilio F. Zegarra, Pittsburgh, PA (US); Dong Feng Li, Cranberry Township, PA (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 09/837,437

(22) Filed: Apr. 18, 2001

(65) Prior Publication Data
US 2002/0154173 A1 Oct. 24, 2002

(51) Int. Cl.
*G06F 3/00* (2006.01)
(52) U.S. Cl. .................. 715/786; 715/833; 715/974
(58) Field of Classification Search .............. 345/786, 345/716, 501, 619, 833
See application file for complete search history.

(56) References Cited

U.S. PATENT DOCUMENTS

| 4,751,507 | A | * | 6/1988 | Hama et al. .................. 715/784 |
| 4,837,635 | A | * | 6/1989 | Santos ........................ 358/401 |
| 4,982,345 | A | * | 1/1991 | Callahan et al. ............ 345/628 |
| 5,187,776 | A | * | 2/1993 | Yanker ........................ 345/800 |
| 5,263,134 | A | * | 11/1993 | Paal et al. ................... 345/788 |
| 5,483,468 | A | | 1/1996 | Chen et al. ............ 364/551.01 |
| 5,553,225 | A | * | 9/1996 | Perry ......................... 345/786 |
| 5,566,291 | A | | 10/1996 | Boulton et al. ............. 395/161 |
| 5,596,689 | A | * | 1/1997 | Tamura et al. .............. 345/661 |
| 5,634,064 | A | * | 5/1997 | Warnock et al. ............ 715/513 |
| 5,682,488 | A | * | 10/1997 | Gleason et al. ............. 715/833 |
| 5,717,869 | A | * | 2/1998 | Moran et al. ............... 345/716 |
| 5,819,301 | A | * | 10/1998 | Rowe et al. ................. 715/513 |
| 5,877,763 | A | | 3/1999 | Berry et al. ................. 345/345 |
| 5,903,881 | A | | 5/1999 | Schrader et al. ............. 704/42 |
| 6,029,176 | A | | 2/2000 | Cannon ....................... 707/104 |

(Continued)

FOREIGN PATENT DOCUMENTS

WO  WO 00/1935  6/2000

OTHER PUBLICATIONS

North, Chris, User Controlled Overviews of an Image Library: The Visible Human Explorer, University of Maryland, pp. 1-4, 1995.*

(Continued)

*Primary Examiner*—Kristine Kincaid
*Assistant Examiner*—Ryan Pitaro
(74) *Attorney, Agent, or Firm*—Synnestvedt & Lechner LLP; Martin McKinley, Esq.

(57) ABSTRACT

A graphical user interface for direct control of data displayed in a window-based computing environment. A slider element is displayed which is variable in size according to user input. The slider defines a selected area of an image, which is then displayed. The scope of the selected area corresponds to the size of the slider. The resizable slider is then resized by a user's direct manipulation, e.g. by a click-and-drag technique, to redefine the selected area, which is then displayed. The scope of the redefined selected area corresponds to the size of the resized slider. Accordingly, a user directly controls (by resizing the slider) the scope of data displayed in a window, and directly controls the presentation of data by translating the slider to define various selected areas. More than one independently resizable slider may intersect to define the selected area and provide independent control of scope in various directions.

16 Claims, 7 Drawing Sheets

U.S. PATENT DOCUMENTS

| | | | |
|---|---|---|---|
| 6,125,375 A | 9/2000 | Atkins et al. | 707/502 |
| 6,411,275 B1* | 6/2002 | Hedberg | 345/156 |
| 6,711,283 B1* | 3/2004 | Soenksen | 382/133 |
| 6,769,131 B1* | 7/2004 | Tanaka et al. | 725/105 |
| 6,803,931 B1* | 10/2004 | Roman et al. | 715/800 |
| 2002/0002562 A1* | 1/2002 | Moran et al. | 707/500 |
| 2002/0063737 A1* | 5/2002 | Feig et al. | 345/786 |

OTHER PUBLICATIONS

Stephen G. Eick, Joseph L. Steffen and Eric E. Sumner, Jr., "Seesoft-A Tool For Visualizing Line Oriented Software Statistics", IEEE Transactions on Software Engineering, vol. 18, #11 (pp. 957-968) (1992).

* cited by examiner

GRAPHICAL USER INTERFACE FOR DIRECT CONTROL OF DISPLAY OF DATA

BACKGROUND OF THE INVENTION

1. Field of the Invention

The present invention relates generally to graphical user interfaces for computer systems. In particular, the present invention relates to a graphical user interface for providing a user with direct control of a scope and presentation of data displayed in a display window of a window-based computing environment.

2. Description of the Related Art

Computers are widely used in schools, homes, and the workplace, and the inexperience of many computer users has imposed a requirement for enhanced user interfaces. Graphical user interfaces (or GUIs) make human interactions with computers more intuitive by conveying information to users by way of a video monitor or other display device by various combinations of graphical items. Examples of graphical user interfaces are those provided with operating systems such as IBM's OS/2® and Microsoft's Windows 2000®. These operating systems rely on a "window-based" workspace for displaying application programs, operating system information and program groupings. A window is typically user-sizable to occupy a larger or smaller portion of a workstation's video monitor. Typically, the size of the text data, images, etc. (collectively, "data") displayed as an image in the window remains constant, and the portion of the data file displayed in the window varies, e.g. a smaller window permits viewing of a smaller portion of the document, image, etc. ("data file"). Resizing features, and programming techniques for implementing such resizing features are well known in the art.

Windows typically include scroll controls allowing a user to manipulate data displayed in a window of a given size. A relatively large data file can be viewed a portion at a time in a relatively small window by manipulating the scroll controls to control which portion of the data file is displayed in the window at any point in time. Such scroll controls, and programming techniques for implementing them, are well known in the art.

Exemplary scroll controls of the prior art are shown in FIG. 1A, which depicts a window 100 showing an image of an exemplary graph that is part of a data file that is viewable in the window 100. The image shown in FIG. 1A is an excerpt of data shown in the exemplary graph shown in FIG. 1B, as discussed further below. These exemplary graphs represent application server resource and performance metrics "counters". On the right hand side of the window 100 is a scroll bar 130. The scroll bar 130 includes a browse up arrow 132 which can be selected, e.g. by clicking a button of a mouse when a mouse pointer is displayed on a video monitor over arrow 132, to scroll upward and view an upper portion of the data file; a browse down arrow 134 which can be selected to scroll downward; a scroll field 138; and a scroll box 136 slidably moveable within the scroll field 138 as discussed further below.

The scroll box 136 is "yoked" to the display window 100 such that selecting, i.e. clicking, the scroll box 136 and dragging it within the scroll bar 130 along the scroll field 138 causes substantially simultaneous display of an associated portion of the data file in the window. This allows expedited traversal of the related information. In other words, a user's direct manipulation of the scroll box 136 controls the portion of the data file displayed in the window 100. This "yoked" feature, and programming methods for implementing this feature, is well known in the art. Accordingly, traversal of such data may be made at a variable speed. For example, one may rapidly drag the scroll box 136 toward the bottom of the scroll field 138 to view the end of a data file displayed in window 100, then drag slowly to locate an area of interest in the data file, and then drag very slowly to locate a precise point of interest in the data file. These are intuitive and advantageous features of a GUI. However, from a window displaying only a small portion of a data file, it is difficult to determine where one might find an area of interest in the data file, so the data file must be traversed slowly.

As is typical of scroll controls, the size of the scroll bar 130, and therefore the scroll field 138, is determined by the size of the window 100. The scale of the scroll field will vary, however, dependent upon the size of the scroll field 138 corresponds to the size/length of the data file viewable in the window associated with the scroll bar 130. Accordingly, a four inch long scroll field 138 may at one time correspond to a length of a two page document and at another time correspond to a length of a fifty-page document. The scroll box 136 may travel within the scroll field. The scroll box is automatically sized by application software such that the size/length of the scroll box 136 relative to the entire length of the scroll field 138 corresponds to the portion of the data file currently displayed in the window relative to the entire data file. In other words, the scroll box 136 indicates a scope of data displayed in the window. For example, consider a five-page long document data file that is being viewed, a portion at a time, in a window having scroll controls that is sized to display one page of the document at a time (i.e. the scope of the data displayed in the window is one page). In this example, the scroll box 136 would be automatically sized to correspond to approximately one-fifth of the size of the scroll field 138 to represent that the scope of the data being displayed in the window is approximately one-fifth of the size of the data file. The size of the scroll box cannot be varied by the user. Accordingly, a user cannot use the scroll box 136 to control the scope of data displayed in a window. Accordingly, in the example of the five page document, the scroll box could not be resized to display more (or less) than one page of the document in the window.

FIG. 1B shows an exemplary overview graph 110 of application server resource and performance metrics gathered by a "Resource Analyzer" tool of WebSphere® Application Server software manufactured and/or distributed by International Business Machines Corporation of Armonk, N.Y., U.S.A. Such software allows a user to record such data by saving it in a log file. The exemplary graph shows data collected from 12:23 p.m. to 1:15 p.m. Points of interest can be quickly located from this overview graph 110, e.g., at a glance, but cannot be viewed in detail because of the small scale on which the data is displayed. Consider a point of interest at the intersection of lines A and B as shown in overview graph 110. It is difficult to view the overview graph 110 with precision. Accordingly, it is advantageous to view an enlarged portion of the overview graph as a detail graph, such that the data may be viewed more precisely. In other words, it is advantageous to view the data in a display window having a smaller scope. For example, FIG. 1A shows a detail graph 120 of a portion C of the overview graph 110 shown in FIG. 1B. From the detail graph 120 it may be determined that lines A and B intersect at a magnitude of approximately 5.5, although this information is indeterminable from overview graph 110. However, when viewing only a detail graph, as in FIG. 1A, it becomes difficult to locate a point of interest.

Some software applications, such as IBM's WebSphere® Application Server, provide for viewing of log file data using a videocassette recorder ("VCR")—like interface. Such an interface allows a user to rewind, play, stop, fast forward etc. the data displayed in the window or view port, e.g. using corresponding buttons 140*a*, 140*b*, 140*c* 140*d* shown in FIG. 1A. Such a detail view does not provide an overview which allows for quick, "at-a-glance" location of points of interest on the graph. Additionally, such an interface requires the data to be traversed in a linear, i.e. sequential, fashion, and at a constant, predetermined speed (albeit at a play-rate or a faster fast forward-rate). What is needed is a GUI which provides for control over the speed of data traversal and the scope of data displayed in the window by direct manipulation of an element, e.g. using a "click and drag" technique.

As described above, the detail graph 120 could be displayed in a window that is manipulable with a scroll bar, as described above (not shown in FIG. 1A), e.g. by providing a horizontal scroll bar to traverse data from 12:23 p.m. to 1:15 p.m. However, the portion shown in the detail view window would be a fixed proportion of the overview graph 110, as is known in the prior art, e.g. 8 minutes (from 12:35 to 12:43) as shown in the example of FIG. 1A. Applicants have determined that it is desirable to provide a GUI which provides for direct control of the amount, i.e. scope, of data displayed in the detail view, e.g., to view more or less than 8 minutes. It is also desirable to provide a user with direct control of such scope in a GUI, e.g., using "click and drag" and/or "drag and drop" techniques (collectively, "click and drag" techniques) which allow for direct manipulation of elements and which are common to window-based environments.

In some software applications, such as word processing software, zoom controls are provided to control an amount of data displayed within a window of a given size. Zooming results in a change in size of data displayed within the window, and for a given window, a corresponding change in scope of the data displayed within the window. Such zoom controls are typically selected from a menu, e.g. by selecting "200% zoom". Such a zoom is uniform across the entire data file/image, e.g., in both the x and y directions, which may sometimes be undesirable, e.g. when the data varies more widely in one direction than in another direction.

What is needed is a GUI which provides for control over the speed of data traversal and the scope of data displayed in the window by direct manipulation of an element, e.g. using a "click and drag" technique.

Applicants have determined that it is desirable to provide a GUI which provides for direct control of the amount, i.e. scope, of data displayed in the detail view. It is also desirable to provide a user with direct control of such scope in a GUI, e.g., using "click and drag" and/or "drag and drop" techniques (collectively, "click and drag" techniques) which allow for direct manipulation of elements and which are common to window-based environments.

It is also desirable to provide a GUI which allows for independent control of the scope in various directions such that the zoom, or adjusted scope, is not uniform across the data file.

The present invention fulfills these needs, among others.

SUMMARY OF THE INVENTION

The present invention provides a method for providing a graphical user interface for direct control of a scope and presentation of data displayed in a display window of a window-based computing environment. The scope and presentation of data is controlled by direct control of elements displayed on a video monitor using familiar, intuitive GUI techniques, such as a "click and drag" technique.

In particular, the present invention provides a method including the step of displaying a slider element which is variable in size according to user input. The slider defines a selected area of an image. The selected area is then displayed, such that the scope of the selected area corresponds to the size of the slider. The method further includes the step of resizing the slider responsive to a user's direct manipulation of the slider element. For example, this may be performed upon accepting user input provided by manipulating a mouse, e.g. using a click-and-drag technique. Resizing of the slider redefines the selected area. The scope of the redefined selected area corresponds to the size of the resized slider. Finally, the method includes the step of displaying the redefined selected area. Accordingly, a user directly controls (by resizing the slider) the scope of data displayed in a window, and directly controls the presentation of data by translating the slider to define various selected areas.

In one embodiment, more than one translatable and resizable slider is provided. In such an embodiment, the sliders intersect to define the selected portion of the image. Each slider is independently resizable. This provides the user with direct independent control over the scope in various directions, e.g. in the x and y directions.

Preferably the slider(s) are displayed superimposed over an overview window which displays an entire image providing an at-a-glance summary of the data, and the overview window is displayed adjacent a detail window in a single field of view of a video monitor, the detail window showing the selected area of the overview window with greater detail, e.g. enlarged.

A system and computer program product for carrying out the inventive method are also provided.

DESCRIPTION OF THE PREFERRED EMBODIMENT

Figure 1:
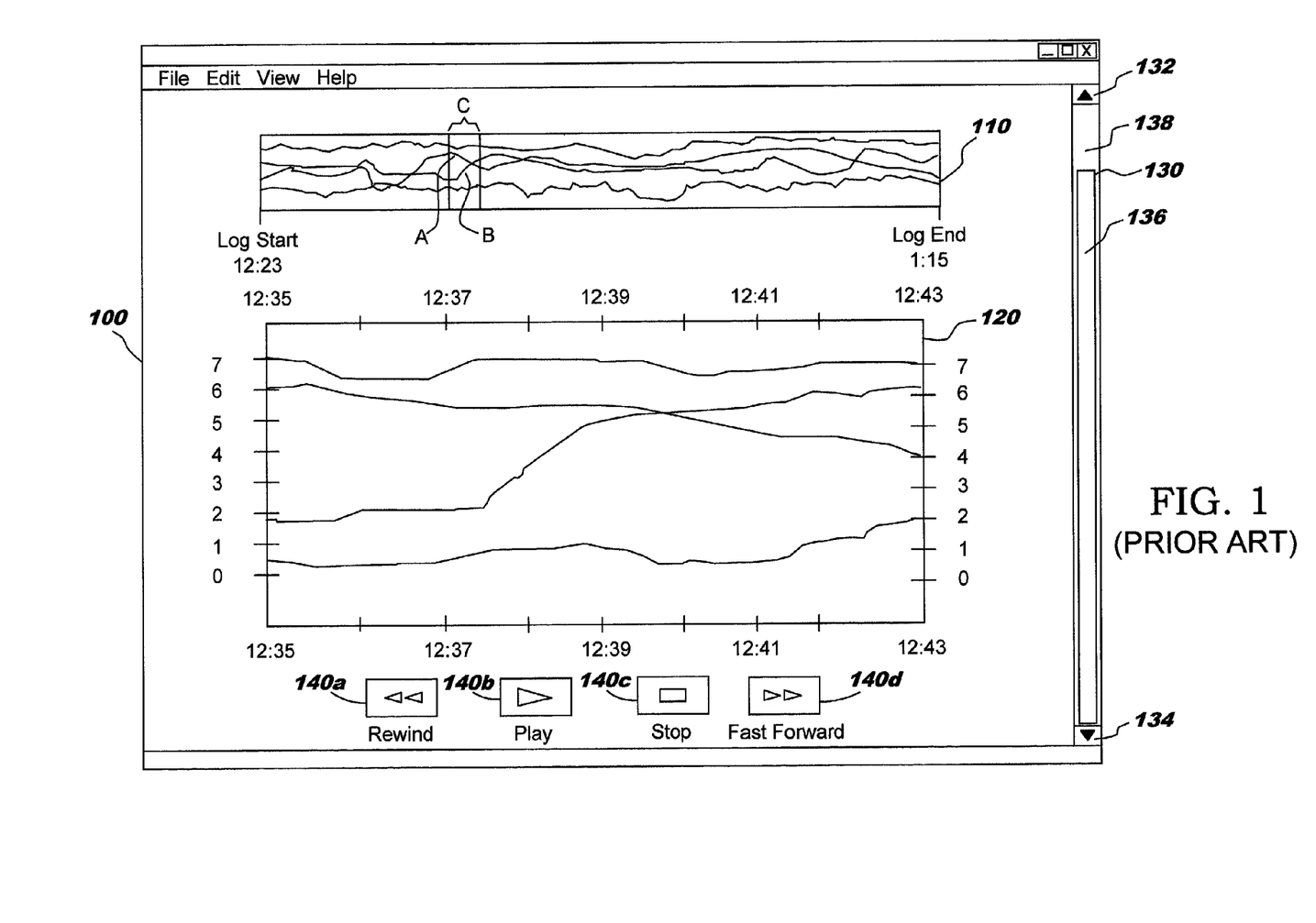
FIG. 1A is a diagram of an exemplary display window with scroll controls, as is known in window-based computing environments of the prior art.
FIG. 1B is a diagram of an exemplary graph used in FIG. 1A for illustrative purposes.
Figure 2:
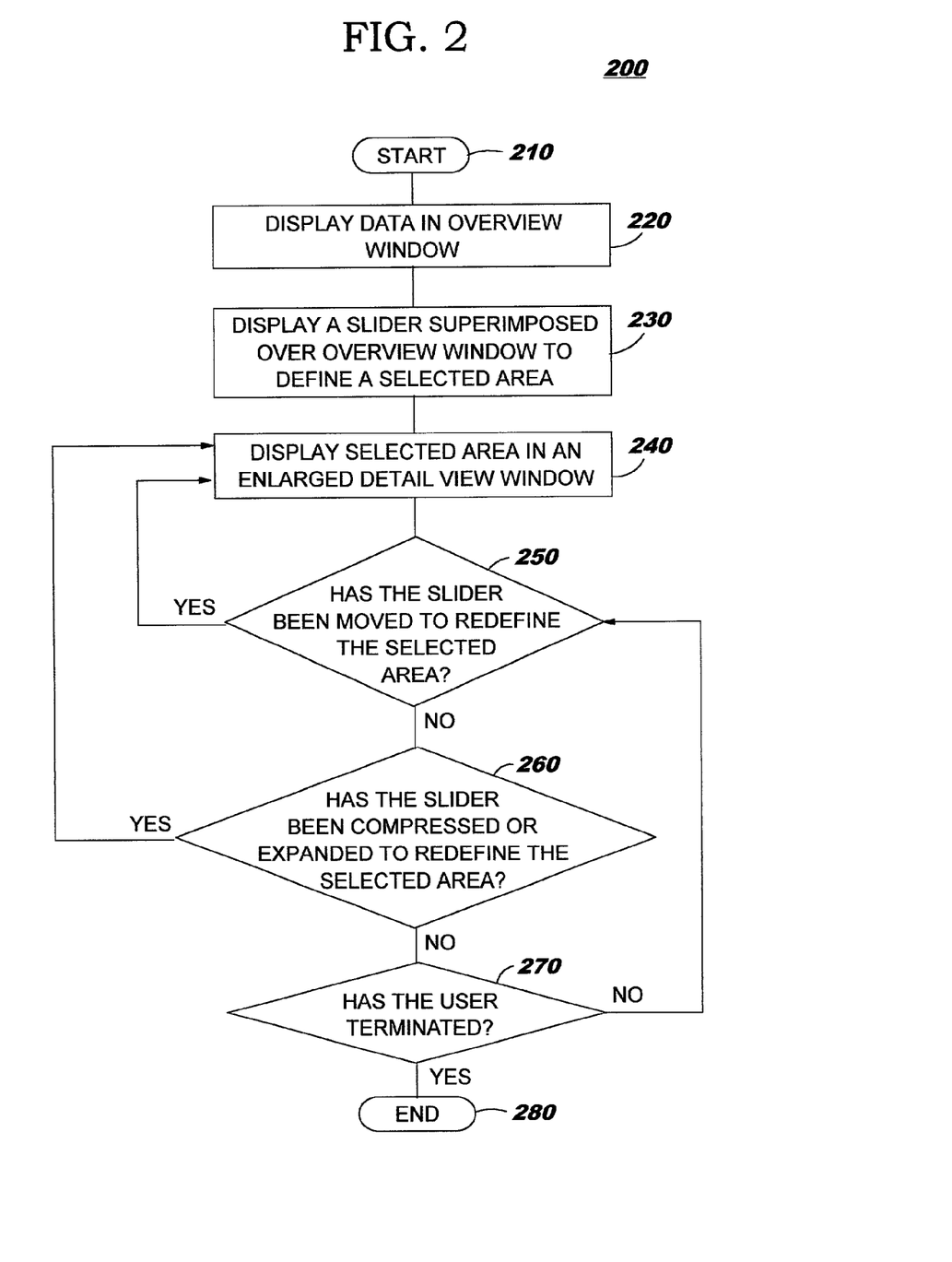
FIG. 2 is a flowchart which sets forth logic for displaying data in accordance with a preferred embodiment of the present invention.

FIG. 2 is a flowchart 200 which sets forth logic for displaying data in accordance with a preferred embodiment of the present invention. As shown in FIG. 2, the method starts with display of data, e.g. as an image, in an overview window, as shown at steps 210, 220. For example, the image may represent a graph of collected data, a textual document, a photograph-like image, etc. The overview window may be a window of the type known in a window-based environment. Alternatively, the overview window may simply be an area defined for display of the image, which itself may be displayed within a window. In other words, the overview window simply as a view port for data. As such, the overview window need not be manipulable in the manners in which window 100 is manipulable, e.g. for minimization, maximization, resizing, scrolling, etc. For example, detail graph 120 defines an overview window area within window 100, as shown in FIG. 1A. The overview window preferably displays all data associated with a data file, e.g. an entire graph, within a single field of view, i.e. within the confines of a video monitor without the need for scrolling, zooming out, etc. This will typically require viewing of the data on a scale that is smaller than is comfortable for discerning details in the data with precision. However, such an overview window provides an "at-a-glance" overview which makes it easy to quickly locate points or areas of interest in the data file.

Figure 3:
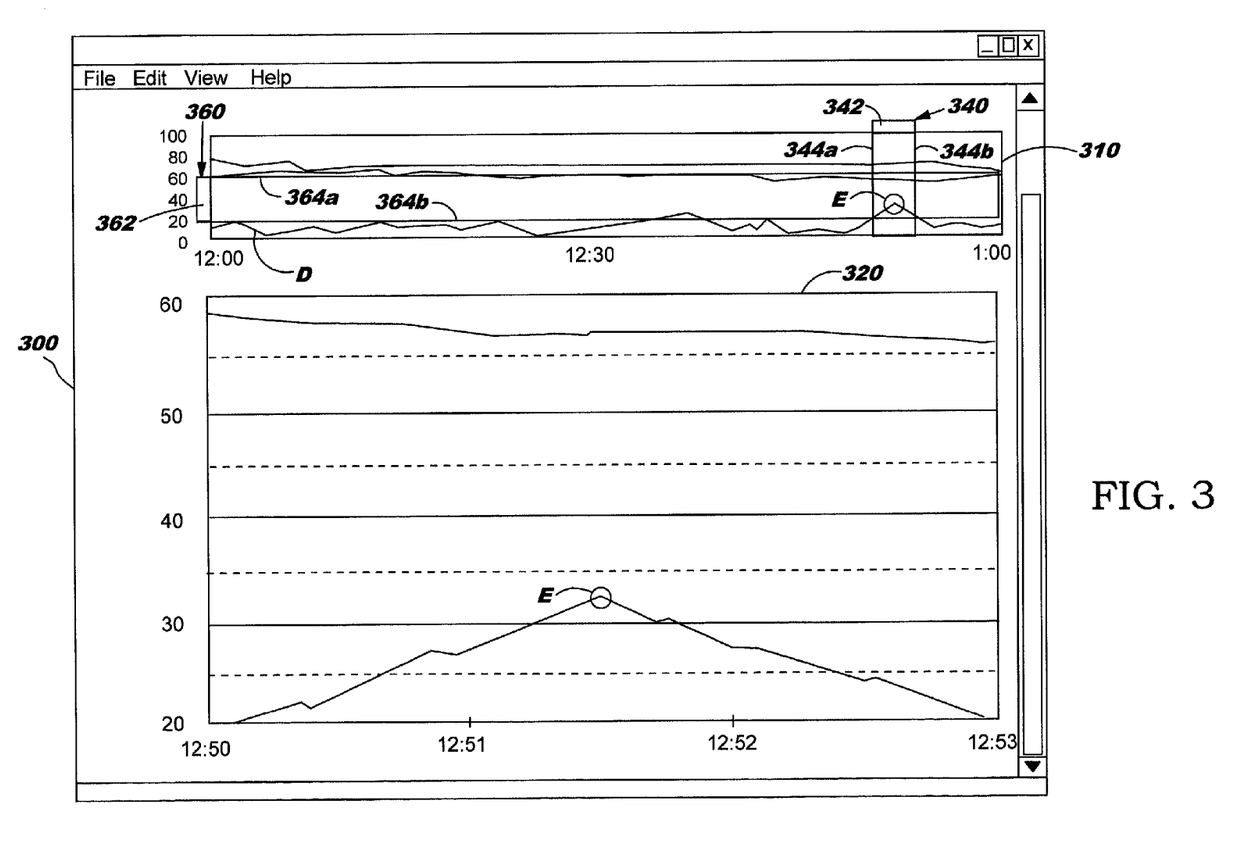
FIG. 3 is a diagram of an exemplary display window with slider controls, in accordance with one embodiment of the present invention.

For example, consider data collected from 12:00 p.m. to 1:00 p.m., e.g. representing resource and performance metrics of a monitored application server. In the example of FIG. 3, the data varies in magnitude from a scale of 0 to 100 Units. Such data is shown graphically in overview window 310 of window 300 of FIG. 3. For example, consider that a user wishes to find a maximum value for curve D of the data. From overview window 310, the computer user can quickly, i.e. at-a-glance, discern that point E is a point of interest. However, from the overview window 310, the user cannot determine with precision the magnitude at point E, or the time of its occurrence.

In accordance with the present invention, a slider element is next displayed on a video monitor. The slider may have predetermined or initial dimensions, but is variable in size according to user input. The slider may take many forms. In the example of FIG. 3, slider 340 includes a grab bar 340 and a pair of boundary lines 344a, 344b. The boundary lines 344a, 344b are displayed superimposed over the image, e.g a graph, in overview window 310. In this manner, slider 340 defines a user-selected area between its boundary lines 344a, 344b. Slider 340 is translatable, i.e. slidably movable, in the x-direction (horizontally in FIG. 3) to define selected areas between 12:00 p.m. and 1:00 p.m. In this example, slider 340 is translatable only within the boundaries of the overview window 310.

A user may directly manipulate the slider to cause translation. Methods of direct manipulation causing translation are well known in the art for windows environments. For example, the user may use an input device such as a computer mouse to position a pointer displayed on a video monitor of the user's computer workstation until the pointer is positioned over grab bar 342. The user may then depress and hold a mouse button, i.e. "click", and then move, i.e. "drag" the mouse to move the slider until the slider is positioned to the user's satisfaction, at which the time user releases the mouse button to release or "drop" the slider. In other words, the slider may be directly manipulated using a click-and-drag technique of a type well known in the art for window-based environments. Programming techniques for implementing a slider in accordance with the present invention are well known in the art. For example, such sliders may be implemented using DHTML and/or JAVA programming.

In the example of FIG. 3, the user has translated slider 340 to define a selected area, i.e. a first portion, which includes point of interest E.

Referring now to FIG. 2, the selected area is then displayed, as shown at step 240. Preferably the selected area is displayed in a detail window which is enlarged relative to the overview window to permit the data to be viewed with a higher degree of precision. An enlarged detail window 320 is shown in FIG. 3. In this example, the detail window 320, like the overview window 310, is an area in which the data is displayed, and is not manipulable, e.g. for maximization, minimization, resizing, scrolling as is known in the art for window-based environments. Preferably, the slider 340 is yoked to the detail window 320 and/or the data displayed in the detail window 320 to cause nearly simultaneous display in the detail window of data currently selected with the slider. In this manner, as the slider is moved (or resized, as discussed below), the data displayed in the detail window 320 is refreshed to display data associated with the relocated slider.

In an alternate embodiment, the slider is not so yoked; rather, the slider may be moved (or resized) and the appropriate data is not retrieved and the detail window is not refreshed with the current data until the slider is "dropped", i.e. until the mouse button is released. This alternate embodiment is particularly advantageous for relatively large sets of data, e.g. data sets with respect to which a large-scale database query would be required to retrieve the required data for display in the detail window.

In a preferred embodiment, the detail window 320 and the overview window 310 are displayed adjacent one another within a single field of view, i.e. within the confines of window 300 of a video monitor display without the need for scrolling, zooming out, etc, as is shown in FIG. 3.

The scope of the data displayed in the detail window corresponds to a size of the slider. In the example of FIG. 3, slider 340 spans three minutes in the x-direction (along the Time axis). Accordingly, detail window 310 displays, on a larger scale, the three minutes of the graph encompassed by slider 340 in overview window 310. From detail window 310, it can be readily discerned that point E occurred at approximately 12:51:30 p.m. Such detail is not readily discernible from overview window 310. Accordingly, the data may be viewed more precisely in the detail window than in the overview window.

Optionally, as in the example of FIG. 3, a second slider 360 is also displayed. Like slider 340, second slider 360 has a grab bar 362 and a pair of boundary lines 364a, 364b which are superimposed over the overview window 310. Second slider 360 is translatable, but only in the y-direction (along the Units axis). The second slider 360 cooperates with slider 340 to define the selected area, namely, the area defined by the intersection of the boundary lines 344a, 344b, 364a, 364b of the sliders 340, 360. In the example of FIG. 3, slider 360 has a size spanning 40 units and has been translated using a click-and-drag technique to encompass point of interest E. Accordingly, detail window 320 spans 40 units in the y-direction, namely, from 20 to 60 units. From detail window 310, it can be readily discerned that the magnitude at point E is 35 units, although such data is not readily discernible from overview window 310.

Figure 4:
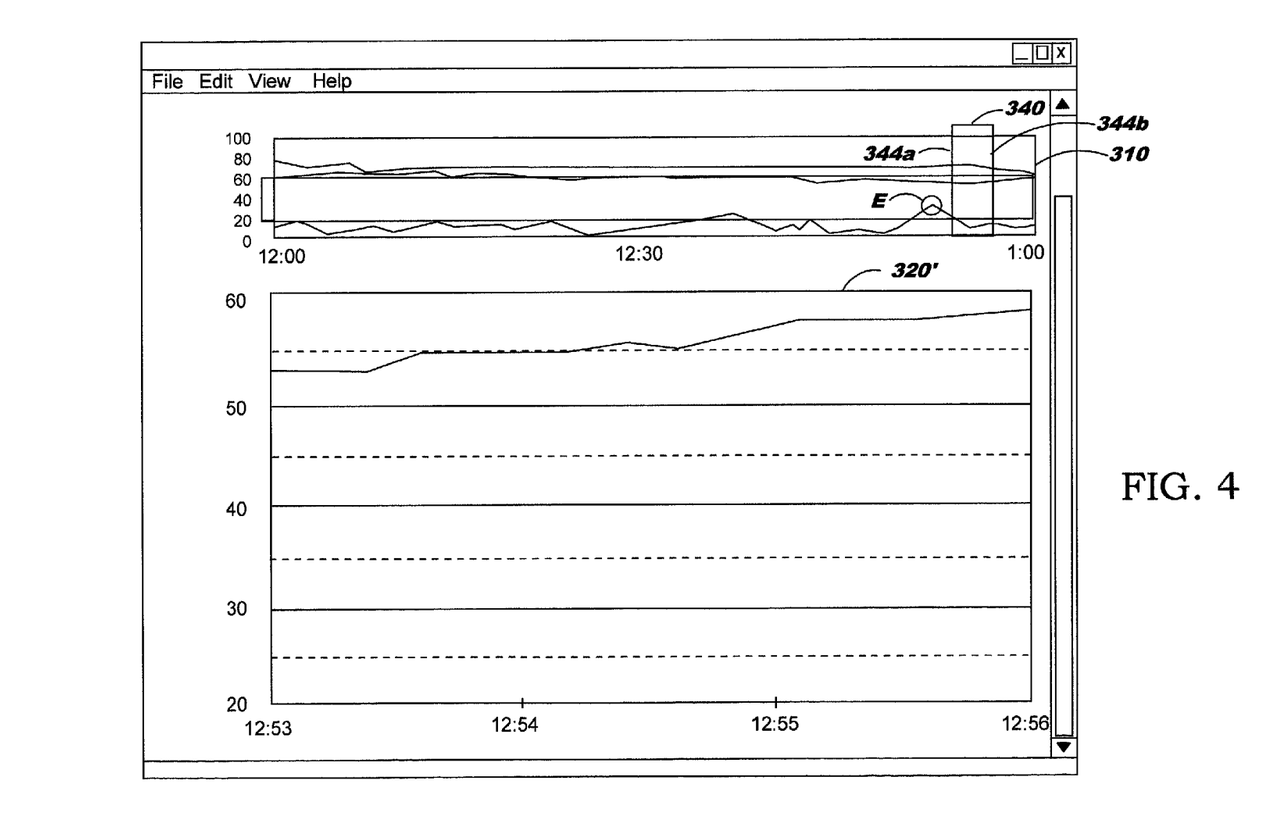
FIG. 4 is a diagram of the exemplary display window of FIG. 3, showing translation of a first slider in a first direction.

Referring now to FIG. 2, it is next determined whether the slider has been moved, e.g. translated, to redefine the selected area, as shown at step 250. For example, consider slider 340 shown in FIG. 3. Slider 340 is shown in a position spanning data from 12:50 to 12:53 p.m. That slider may be translated, i.e. moved, to select a different three-minute portion of the overview graph. FIG. 4 is a diagram of the exemplary display window of FIG. 3, showing an exemplary translation of slider 340. In the example of FIG. 4, slider 340 has been translated in a first direction, namely the x-direction (along the Time axis). As shown in FIG. 4, the boundary lines 344a, 344b no longer encompass point E, due to the translation. Accordingly, in this example, it is determined in step 250 that the slider has been moved. This movement of the slider redefines the selected area. Accordingly, the newly defined selected area is displayed in the enlarged detail window, as shown at step 240. Accordingly, FIG. 4 shows detail window 320' spanning a three-minute interval from 12:53 to 12:56 p.m. Using a click-and-drag technique as described above, the slider can be moved horizontally along the overview window to display data in the detail window 320' any three-minute span of data from 12:00 p.m. to 1:00 p.m. Accordingly, the data may be traversed at a variable speed, according to the variable speed at which the mouse is manipulated by a user, which provides for quick access to data of interest.

Each slider 340, 360 is variable in size according to user input. Resizing of the slider redefines the scope of the detail window. In accordance with the present invention, a user may directly manipulate each slider for resizing purposes using known click-and-drag techniques. Programming methods and techniques for resizing a slider are straightforward. For example, when a user moves a computer mouse to position a pointer displayed on a video monitor near, e.g. within 3 pixels, or over a boundary that the user wishes to move, the pointer changes form to a double-headed arrow pointing in the directions in which the boundary may be moved. For example, a user could position the mouse pointer over boundary 344a of slider 340 and click and drag the boundary 344a, e.g. leftwards to increase its size.

If it is determined in step 250 that the slider has not been moved, it is next determined whether the slider has been compressed or expanded (collectively, "resized") to redefine the selected area, as shown at step 260. A user may provide user input to initiate resizing of a slider using a click-and-drag technique as generally known in the art for resizing a window. In other words, user input is provided to the inventive software for carrying out the inventive method responsive to a user's direct manipulation of the slider by the user's manipulation of an input device, e.g. mouse.

Figure 5:
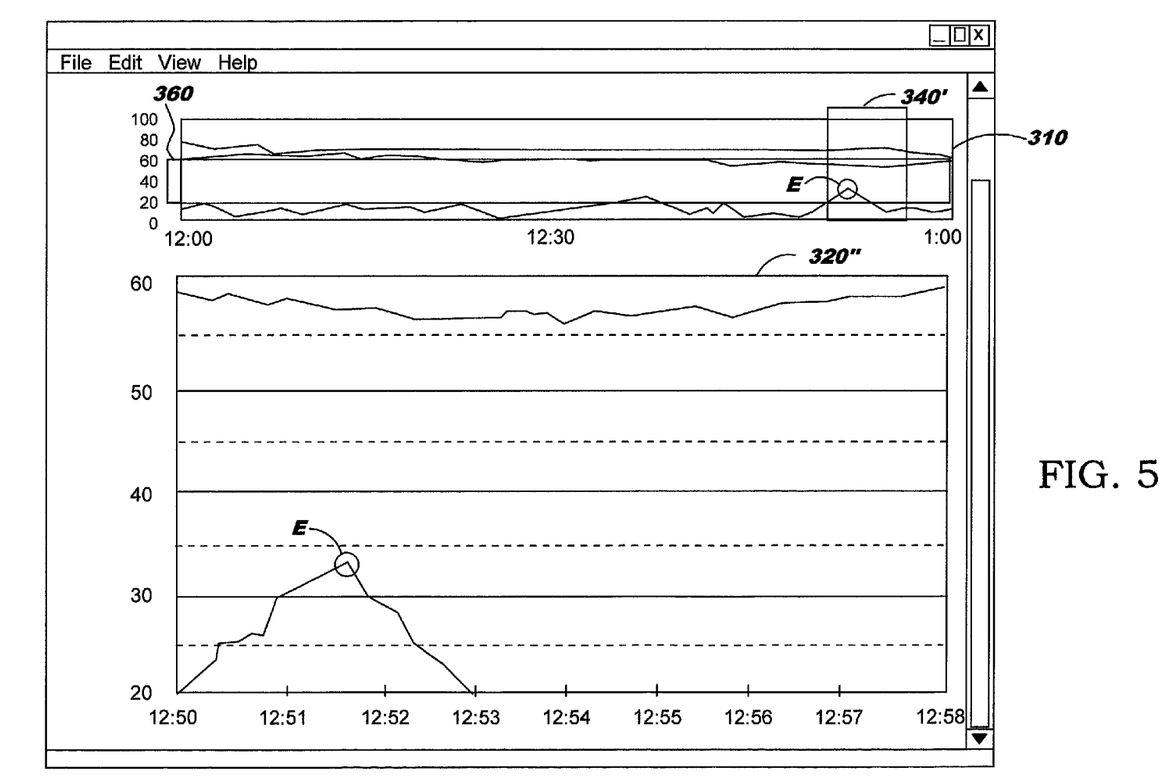
FIG. 5 is a diagram of the exemplary display window of FIG. 3, showing expansion of the first slider in the first direction.

FIG. 5 is a diagram of the exemplary display window of FIG. 3, showing expansion of slider 340 in the x-direction (along the Time axis), e.g. after clicking and dragging boundary line 344b to the right as shown in FIG. 5, until slider 340' spans eight minutes, as shown in FIG. 5. Accordingly, in the example of FIG. 5, it is determined that the slider has been resized in step 260. This redefines the selected area and therefore the scope of data to be displayed in the detail window. In other words, the resizing of the slider defines a second portion of the data that corresponds to the size of the resized slider. Accordingly, as shown in FIG. 2, the redefined selected area is then displayed in the detail window 320", as shown in FIG. 5. As can be seen from detail window 320" in FIG. 5, resized slider 340' spans eight minutes, from 12:50 p.m. to 12:58 p.m. Accordingly, more of the graph in the overview window 310 is enlarged and displayed in detail window 320", and therefore can be viewed with precision. In this manner, the scope of the data displayed in the detail window is controlled by the user by direct manipulation of the slider, e.g. by an advantageous and intuitive click-and-drag technique familiar in window-based environments.

The second portion is displayed in the same area that the first portion was displayed, i.e. in the detail window. Preferably the second portion is displayed instead of the first portion, i.e. the detail window is refreshed to show the selected area currently defined by the slider.

Figure 6:
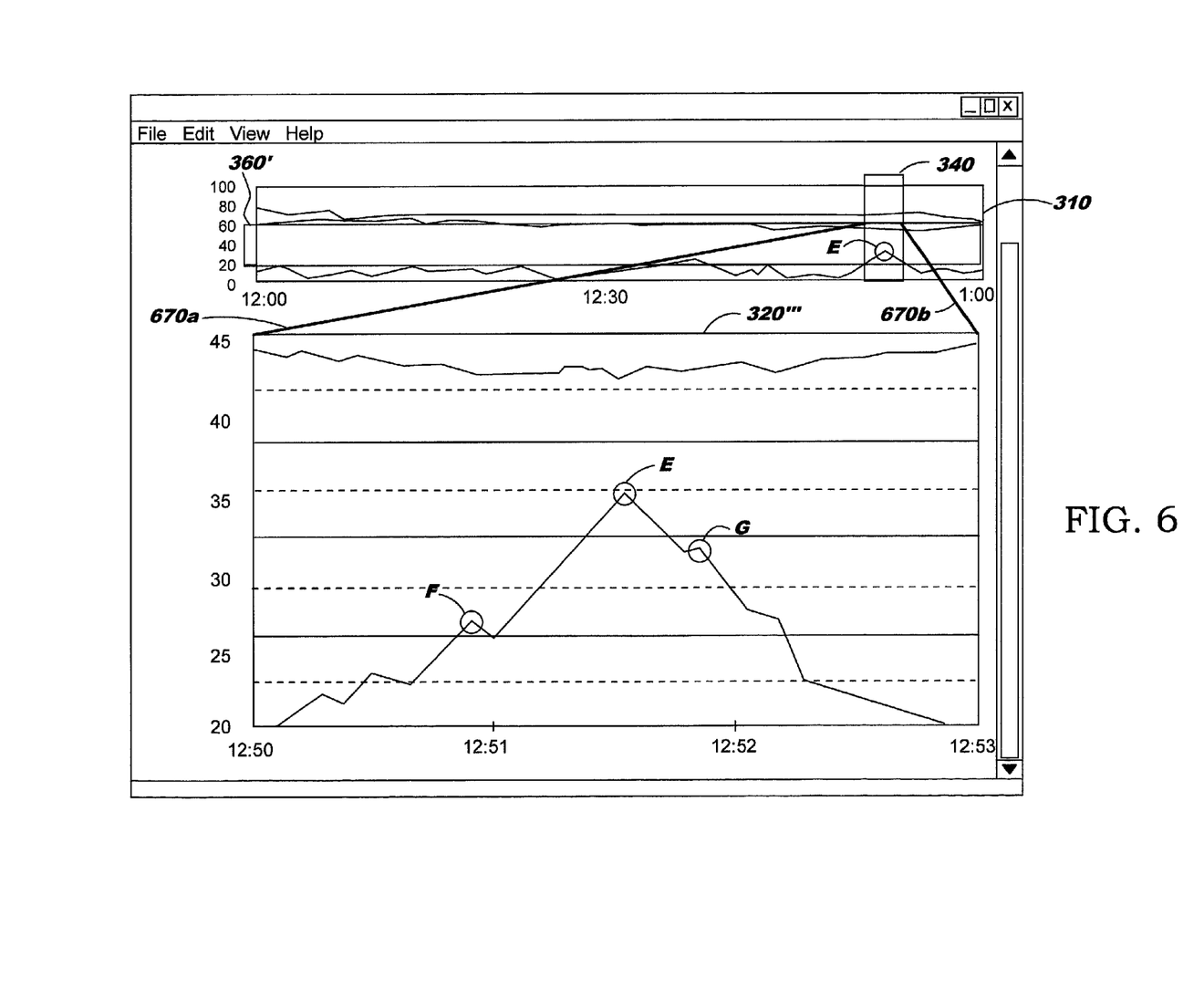
FIG. 6 is a diagram of the exemplary display window of FIG. 3, showing compression of a second slider in a second direction.

By way of further example, FIG. 6 is a diagram of the exemplary display window of FIG. 3, showing compression of the second slider 360 in a second direction, namely the y-direction (along the Units axis). When the slider is resized to redefine a selected area, the redefined selected area is displayed in the detail window, as discussed above with reference to FIG. 5. In the example of FIG. 6, slider 360' spans 25 Units, whereas as slider 360 of FIG. 3 spans 40 Units. Accordingly, the portion of curve D shown in detail window 320'" may be viewed with greater position. For example, secondary and tertiary peaks F and G are clearly discernible in detail window 320'", although they are hardly discernible in detail window 320 of FIG. 3 and virtually invisible in overview window 310. In the example of FIG. 6, slider 340 has not been resized; slider 340 spans three minutes, as can be seen from detail window 320'".

Accordingly, the present invention provides a user with direct control over the scope of data displayed in the y-direction independently of the scope of data displayed in the x-direction. This greatly enhances the ability of the user to view selected portions of the data with precision, which is helpful for data interpretation, etc. This capability is especially useful for viewing with precision heterogeneous data which may extend over a wide range of values, e.g. in the y-direction. For example, for one three-minute period it may be useful to examine data over a range of 50 Units, while for another three-minute period it may be necessary to examine data over a range of only 10 Units, due to particularities in the data.

If it is determined that the neither slider has been moved or resized, i.e. if the selected area has not been redefined, it is next determined if the user has terminated the software application in which the present invention is being used, user session, etc., as shown at step 270. If so, the method ends, as shown at step 280. If not, the logic returns to step 250 to again determine whether a slider has been moved or resized, and this continues until the user terminates and the method ends.

In one embodiment, a "visual momentum" technique is used to provide a graphical representation which reinforces that the scope of the slider is equivalent to the scope of the detail window. For example, a pair of lines 670a, 670b may be displayed extending from the vertical boundary lines 344a, 344b of slider 340 to the vertical edges of detail window 320 to provide such visual momentum, as shown in FIG. 6. Alternate, graphical visual momentum techniques relating slider size to detail window size are also contemplated herein.

Although not illustrated herein, in an alternate embodiment, a scroll box of the type generally known in the art is directly resizable by a user. In such an embodiment, the scroll box acts as a slider which is resizable to vary the scope of data displayed within a corresponding window. In such an embodiment, for example, the slider is not displayed superimposed over at least a portion of the image to be viewed, and a detail window does not appear adjacent an overview window. Rather, such a display embodying the present invention appears very much like FIG. 1 (without buttons 140a, 140b, 140c, 140d). However the functionality of the window is different in that scroll box 136 can be resized by a user using a click-and-drag technique to vary the scope of data displayed within the window 100.

Figure 7:
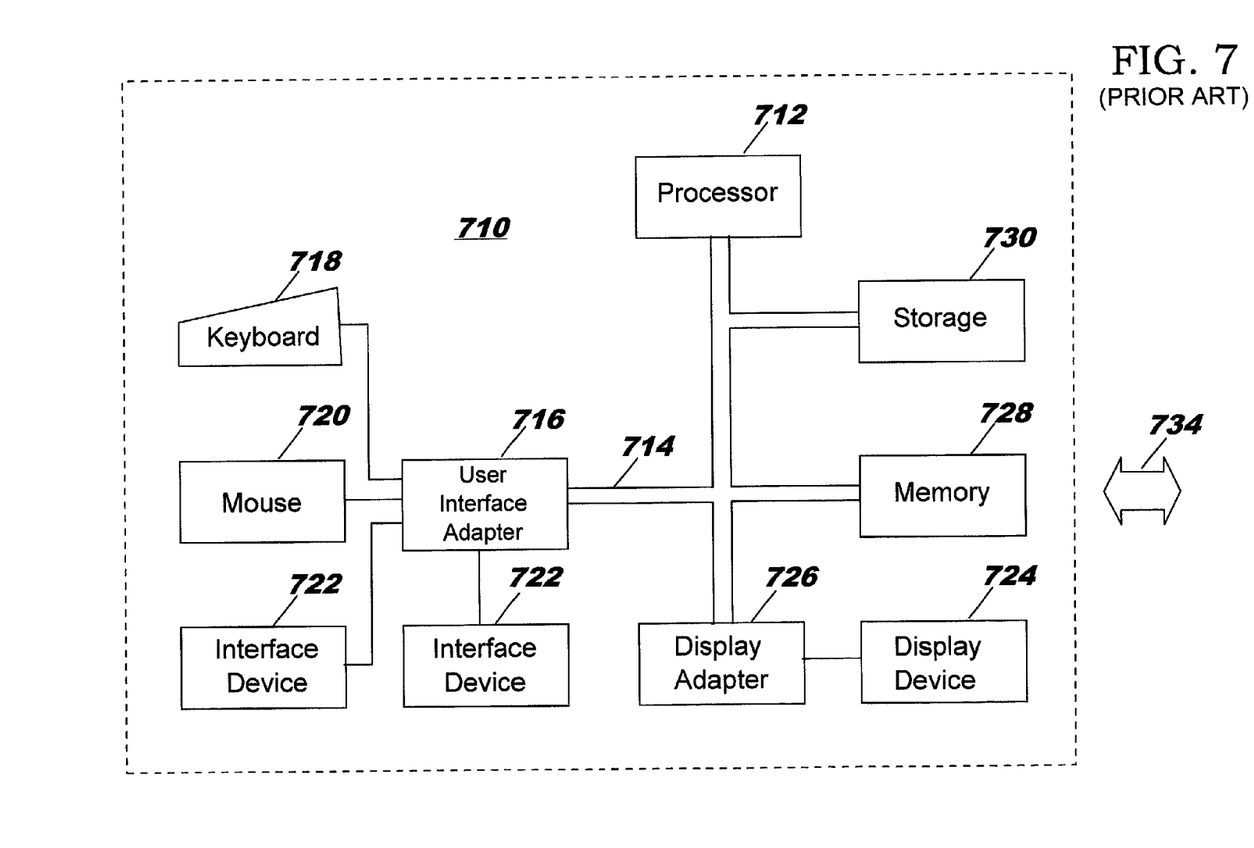
FIG. 7 is illustrative of a computer system in which the present invention may be practiced.

FIG. 7 is illustrative of a computer system in which the present invention may be practiced. The hardware of the workstation of FIG. 7 is of a type well known in the art. The environment of FIG. 7 comprises a representative single user computer workstation 710, such as a personal computer, including related peripheral devices. The workstation 710 includes a microprocessor 712 and a bus 714 employed to connect and enable communication between the microprocessor 712 and the components of the workstation 710 in accordance with known techniques. The workstation 710 typically includes a user interface adapter 716, which connects the microprocessor 712 via the bus 714 to one or more interface devices, such as a keyboard 718, mouse 720, and/or other interface devices 722, which can be any user interface device, such as a touch sensitive screen, digitized entry pad, etc. The bus 714 also connects a display device 724, such as an LCD screen or monitor, to the microprocessor 712 via a display adapter 726. The bus 714 also connects the microprocessor 712 to memory 728 and long-term storage 730 which can include a hard drive, diskette drive, tape drive, etc.

The workstation 710 may communicate with other computers or networks of computers, for example via a communications channel or modem 732. Alternatively, the workstation 710 may communicate using a wireless interface at 732, such as a CDPD (cellular digital packet data) card. The workstation 710 may be associated with such other computers in a LAN or a wide area network (WAN), or the workstation 710 can be a client in a client/server arrangement with another computer, etc. All of these configurations, as well as the appropriate communications hardware and software, are known in the art.

The present invention may operate on a server or mainframe (referred to hereinafter as a server, for ease of reference), rather than on a workstation. The hardware environment of a server is well known in the art. Or, the present invention may operate on other computing devices such as personal digital assistants (PDAs), portable computing devices, etc. The documents created through use of the present invention may be stored on permanent or removable storage media used by a computing device, and/or may be transmitted between such a device and a server, or between a server and another server, where these types of devices may be connected by a network.

In the preferred embodiment, the present invention is implemented in computer software. The implementation of this software may operate as one or more modules (also referred to as code subroutines, or "objects" in object-oriented programming) of one or more computer programs.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A method for displaying a user-selected portion of an image, said method comprising:

displaying said image via a graphical user interface;
providing a display area of a certain size via the graphical user interface, said display area being provided adjacent said image;
displaying a first slider that is variable in size according to user input, said first slider being displayed superimposed aver said image to define a corresponding first portion of said image within a boundary of said first slider;
displaying a second slider, said second slider being distinct from said first slider and being superimposed over said image, both said first slider and said second slider being displayed in two-dimensional space, said second slider cooperating with said first slider to define a portion of said image at an intersection of said second slider and said first slider, said first slider being translatable and resizable along a first axis within said two-dimensional space that is orthogonal to a second axis within said two-dimensional space along which said second slider is translatable and resizable, said second slider being variable in size according to user input;
displaying said portion of said image in said display area, said portion of said image being enlarged relative to said image to fill said display area of said certain size;
accepting user input to resize one of said first and second sliders, the user input being accepted responsive to a users manipulation of an input device;
displaying said one of said first and second sliders as resized, said resized one of said first and second sliders being displayed superimposed over said image to define a corresponding portion of said image within said boundary of said one of said first and second sliders; and
displaying said corresponding portion of said image in said display area, said corresponding portion of said image being enlarged relative to said image to fill said display area of said certain size.

2. The method of claim 1, wherein said users manipulation of said input device comprises a click-and-drag technique.

3. The method of claim 1, wherein said first slider is translatable over said image.

4. The method of claim 1 wherein a visual momentum technique is used to relate said corresponding portion of said image to said image.

5. The method of claim 4, wherein said visual momentum technique comprises displaying a pair of lines extending from said corresponding portion of said image to said image.

6. The method of claim 1, wherein said first slider comprises a scroll box of a scroll bar.

7. A method for displaying a user-selected portion of an image, Baid method comprising:

displaying said image via a graphical user interface;
displaying a first slider that is variable in size according to user input, at least a portion of said first slider being superimposed over said image;
displaying a second slider that is variable in size according to user input, both said first slider and said second slider being displayed in two-dimensional space, at least a portion of said second slider being superimposed over said image and intersecting said first slider within said two-dimensional space, said second slider cooperating with said first slider to define a first portion of said image at an intersection of said first slider and said second slider, said first slider being translatable and resizable along a first axis within said two-dimensional space that is orthogonal to a second axis within said two-dimensionar space along which said second slider is translatable and resizable;

accepting user input to resize said first slider or said second slider and thereby define a second portion of said image at their intersection; and displaying in a display area of a certain size said second portion of said image. said second portion of said image filling said display area.

8. The method of claim 7, wherein said user input is provided by a click-and-drag technique.

9. The method of claim 7, wherein said first portion or said second portion of said image is displayed adjacent said image.

10. A system for displaying a user-selected portion of an image, said system comprising:

means for displaying a first slider, said first slider being variable in size according to user input;

means for providing a display area of a certain size;

means for resizing said first slider;

means for displaying any selected portion of said image in said display area to fill said display area of said certain size, a scope of said portion of said image corresponding to a size of said first slider as resized; and means for displaying a second slider, said second slider cooperating with said first slider to define said portion of said image, said first slider being variable in size according to user input;

wherein said portion of said image is defined responsive to a user's resizing of said first slider or said second slider.

11. A computer program product for displaying a user-selected portion of an image, said computer program product comprising:

computer readable program code embodied in a computer readable medium, the computer readable program code comprising:

computer readable program code for displaying a first slider, said first slider being variable in size according to user input;

computer readable program code for resizing said first slider;

computer readable program code for displaying any selected portion of said image in a display area of a certain size to fill said display area, a scope of said portion of said image corresponding to a size of said first slider as resized; and computer readable program code for displaying a second slider, said second slider cooperating with said first slider to define said portion of said image, said second slider being variable in size according to user input;

wherein said portion of said image is defined responsive to a user's resizing of said first slider or said second slider.

12. The method of claim 1, wherein said first slider is translatable relative to said image along only one axis.

13. The method of claim 12, wherein said first slider is resizable only along said axis.

14. The method of claim 1, wherein said second slider is translatable relative to said image along only a second axis orthogonal to said axis.

15. The method of claim 14, wherein said second slider is resizable along only said second axis.

16. The method of claim 13, wherein said second slider is translatable relative to said image along only a second axis orthogonal to said axis, and wherein said second slider is resizable along only said second axis.

* * * * *